(12) United States Patent  (10) Patent No.: US 8,799,285 B1
Gasch  (45) Date of Patent: *Aug. 5, 2014

(54) AUTOMATIC ADVERTISING CAMPAIGN STRUCTURE SUGGESTION

(75) Inventor: Scott Gasch, Kirkland, WA (US)

(73) Assignee: Google Inc., Mountain View, CA (US)

( * ) Notice: Subject to any disclaimer, the term of this patent is extended or adjusted under 35 U.S.C. 154(b) by 1369 days.

This patent is subject to a terminal disclaimer.

(21) Appl. No.: 12/184,824

(22) Filed: Aug. 1, 2008

Related U.S. Application Data

(60) Provisional application No. 60/953,600, filed on Aug. 2, 2007.

(51) Int. Cl.
*G06F 17/30* (2006.01)

(52) U.S. Cl.
USPC .......................... 707/737; 705/14.4

(58) Field of Classification Search
CPC .......... G06Q 30/0277; G06Q 30/0242; G06Q 30/0244; G06Q 30/0241; G06Q 30/0251; G06Q 30/0643; G06Q 30/0243
See application file for complete search history.

(56) References Cited

U.S. PATENT DOCUMENTS

| | | | |
|---|---|---|---|
| 6,785,651 B1 * | 8/2004 | Wang | 704/246 |
| 7,231,393 B1 | 6/2007 | Harik et al. | |
| 7,383,258 B2 | 6/2008 | Harik et al. | |
| 7,778,874 B1 * | 8/2010 | Saunders | 705/14.67 |
| 8,244,521 B2 * | 8/2012 | Dolan | 704/9 |
| 2003/0097384 A1 * | 5/2003 | Hu et al. | 707/514 |
| 2003/0224344 A1 * | 12/2003 | Shamir et al. | 435/4 |
| 2004/0054521 A1 * | 3/2004 | Liu | 704/5 |
| 2006/0173744 A1 | 8/2006 | Kandasamy et al. | |
| 2006/0242013 A1 * | 10/2006 | Agarwal et al. | 705/14 |
| 2006/0242147 A1 | 10/2006 | Gehrking et al. | |
| 2007/0027754 A1 * | 2/2007 | Collins et al. | 705/14 |
| 2007/0033103 A1 | 2/2007 | Collins et al. | |
| 2007/0118392 A1 * | 5/2007 | Zinn et al. | 705/1 |
| 2008/0133479 A1 * | 6/2008 | Zelevinsky et al. | 707/3 |
| 2009/0037399 A1 * | 2/2009 | Bartz et al. | 707/5 |

OTHER PUBLICATIONS

Scott Gasch, "Automatic Advertising Campaign Structure Suggestion", U.S. Appl. No. 12/184,804, filed Aug. 1, 2008, 53pages.
Kevin Lee, "Panama's Relevance Score Causes Pain and Gain", Mar. 16, 2007, 14 pages.

* cited by examiner

*Primary Examiner* — Dinku Gebresenbet
(74) *Attorney, Agent, or Firm* — Fish & Richardson P.C.

(57) ABSTRACT

A group of key terms associated with an ad campaign are identified, each key term including a keyword or a key phrase. The group is automatically classified into two or more sub-groups each having one or more key terms, at least one of the sub-groups having key terms that have a higher similarity level than the key terms in the original group. The two or more sub-groups of key terms are provided to a sponsor of the ad campaign.

26 Claims, 10 Drawing Sheets

AUTOMATIC ADVERTISING CAMPAIGN STRUCTURE SUGGESTION

RELATED APPLICATIONS

This application claims priority to U.S. Provisional Patent Application No. 60/953,600, titled "Automatic Advertising Campaign Structure Suggestion," filed on Aug. 2, 2007. This application is related to U.S. patent application Ser. No. 12/184,804, titled "Automatic Advertising Campaign Structure Suggestion," filed Aug. 1, 2008, (now U.S. Pat. No. 8,554,618). The contents of the above applications are incorporated by reference.

BACKGROUND

This disclosure relates to advertising.

The selection of advertisements ("ads") for presentation (e.g., display), such as with search results and other information, and the ordering of those advertisements, may be achieved by various techniques. In one exemplary technique, an initial determination is made to identify all advertisements that are a match or near match for applied search terms or other query items or information. The match may be made, for example, between one or more words in a query, and keywords identified by an advertiser and associated with a particular advertisement or group of advertisements, such as a campaign.

For example, a company selling fishing tackle may have a line of large lures, and may thus identify terms such as "lunker," "sturgeon," and "muskie fever" as keywords to associate with their advertisements for such large lures. Those advertisements may then be considered by the system for display when search results are displayed to a user who enters such terms. An advertisement may be selected for possible display if there is a "near" match also, for example, if a query includes terms that are known synonyms or mistypings/misspellings of the keyword terms for an advertisement. Some sponsors of the advertisements may associate several (e.g., dozens or hundreds) keywords with each of the advertisements.

SUMMARY

In general, in one aspect, a group of key terms associated with an ad campaign are identified, each key term including a keyword or a key phrase. The group is automatically classified into two or more sub-groups each having one or more key terms, at least one of the sub-groups having key terms that have a higher similarity level than the key terms in the original group. The two or more sub-groups of key terms are provided to a sponsor of the ad campaign.

Implementations may have one or more of the following features. Automatically classifying the group of key terms includes automatically classifying the key terms such that an average semantic distance between key terms in at least one of the sub-groups is smaller than an average semantic distance between the key terms in the original group. The semantic distance between key terms is determined based on semantic distances specified in a semantic database. Automatically classifying the key terms includes identifying N-grams each being common to some of the key terms, and classifying the group based on the N-grams. Automatically classifying the key terms includes identifying semantic clusters of the key terms.

Identifying semantic clusters of the key terms includes constructing a graph to represent relationships among the key terms, and reducing the graph. Constructing the graph includes constructing a graph having vertexes and edges between the vertexes, each vertex representing a key term, each edge indicating a relationship between key terms represented by the vertexes connected by the edge. Constructing the graph includes identifying a weight for each edge, the weight representing a strength of the relationship between key terms represented by the vertexes connected by the edge.

In some examples, reducing the graph includes finding and removing a bridge edge or an articulation vertex to separate the graph into two separate sub-graphs. In some examples, reducing the graph includes finding and breaking a weakest edge in the graph. A condition may be set on the removal of the weakest edge such that the weakest edge is removed only if the edge has a weight that is less than a threshold value. The threshold value can be determined based on a maximum weight of the edges of the graph. For example, the threshold value can be lower when the maximum weight is lower, and the threshold value can be higher when the maximum weight is higher.

After removing an edge or vertex, or breaking a weakest edge, a maximum weight of the edges is determined. The process of reducing the graph ends when the maximum weight is less than a threshold. Identifying the weight for each edge includes looking up a semantic database that has information about relationships among words or phrases or both. Identifying semantic clusters of the key terms includes determining whether to merge two key terms into a sub-group based on predetermined clusters in a semantic database that are associated with each key term. Determining whether to merge two key terms into a sub-group is based on a smooth distribution list of terms associated with the key terms.

The ad campaign is associated with one or more negative key terms. For example, negative key terms can be used to specify that an ad should not appear when the search queries include the negative key terms. The method includes determining associations between the one or more negative key terms and the two or more sub-groups. Automatically classifying the group into two or more sub-groups includes classifying the group into two or more sub-groups of positive key terms without considering the negative key terms.

The ad campaign is associated with one or more creative items, and the method includes determining associations between the one or more creative items and the two or more sub-groups. The creative items refer to, for example, the visual, audio, video, or combination thereof representation of the ads. Information about which one or more sub-groups of key terms are classified based on N-grams, and which one or more sub-groups of key terms are classified based on semantic clustering are provided.

In general, in another aspect, a request to improve an ad campaign from a sponsor of the ad campaign is received, the ad campaign being associated with creative items, a group of positive key terms, and a group of negative key terms, each key term comprising a keyword or a key phrase. The group of positive key terms are classified into two or more smaller sub-groups of positive key terms, at least one of the sub-groups having positive key terms that have a higher similarity level than the key terms in the original group, the classifying of the group being performed based on information about relationships among the positive key terms provided by a semantic database. For each negative key term, which one of the sub-groups is associated with the negative key term is determined. For each creative item, which one of the sub-groups is associated with the creative item is determined. The two or more sub-groups of key terms, associated creative items, and associated negative key terms are provided to the sponsor.

Implementations may have one or more of the following features. Automatically classifying the group of positive key terms includes automatically classifying the positive key terms based on semantic distances between the positive key terms.

In general, in another aspect, two or more new ad campaigns are generated from an original ad campaign by dividing a group of positive key terms associated with the original ad campaign into two or more sub-groups of positive key terms. Each sub-group of key terms is associated with one of the new ad campaigns, each key term including a keyword or a key phrase. For each negative key term of the original ad campaign, a determination is made as to which one of the new ad campaigns is more relevant to the negative keyword, and the negative key term is associated with the new ad campaign that is more relevant.

Implementations may have one or more of the following features. For each negative key term, a first set of topic clusters that are associated with the negative key term is identified, second sets of topic clusters that are each associated with one of the sub-groups of positive key terms are identified, and the first set of topic cluster is compared with each of the second set of topic clusters. Determining which one of the new ad campaigns is more relevant to the negative key term includes determining which second set of topic clusters has a higher degree of overlap with the first set of topic clusters. Identifying the topic clusters includes identifying the topic clusters using a semantic database.

In general, in another aspect, two or more new ad campaigns are generated from an original ad campaign by dividing a group of positive key terms associated with the original ad campaign into two or more sub-groups of positive key terms. Each sub-group of key terms is associated with one of the new ad campaigns, each key term including a keyword or a key phrase. For each creative item of the original ad campaign, a determination is made as to which one of the new ad campaigns is more relevant to the creative item, and the creative item is associated with the new ad campaign that is more relevant.

Implementations may have one or more of the following features. For each creative item, a first set of topic clusters that are associated with the text in the creative item is identified, second sets of topic clusters that are each associated with one of the sub-groups of positive key terms are identified, and the first set of topic cluster is compared with each of the second set of topic clusters. Determining which one of the new ad campaigns is more relevant to the creative item includes determining which second set of topic clusters has a higher degree of overlap with the first set of topic clusters. Identifying the topic clusters includes identifying the topic clusters using a semantic database.

In general, in another aspect, an ad campaign suggestion engine identifies a group of key terms associated with an ad campaign and automatically classifies the group into two or more sub-groups each having one or more key terms, each key term including a keyword or a key phrase, at least one of the sub-groups having key terms that have a higher similarity level than the key terms in the original group.

Implementations may have one or more of the following features. The ad campaign suggestion engine calls a semantic database to obtain information about relationships among at least some of the key terms. A semantic database is provided. The ad campaign suggestion engine includes an N-gram classification engine that identifies N-grams each being common to some of the key terms, and classifies the key terms based on the N-grams. The ad campaign suggestion engine includes a semantic clustering engine that identifies semantic clusters of the key terms.

In some examples, the semantic clustering engine includes a graph reduction engine that constructs a graph having vertexes and edges between the vertexes, and reduces the graph, wherein each vertex represents a key term, and each edge indicates a relationship between key terms connected by the edge. In some examples, the semantic clustering engine includes an agglomerative clustering engine that determines whether to merge two key terms into a sub-group by identifying predetermined clusters in a semantic database that are associated with each key term, and determining similarities between the two key terms based on the predetermined clusters associated with the key terms.

The ad campaign suggestion engine determines associations between one or more negative key terms and the two or more sub-groups, the one or more negative key terms being associated with the ad campaign. The ad campaign suggestion engine determines associations between one or more creative items and the two or more sub-groups, the one or more creative items being associated with the ad campaign.

In general, in another aspect, a group of key terms associated with an ad campaign is identified, each key term including a keyword or a key phrase, the ad campaign being associated with one or more negative key terms; the group is automatically classified into two or more sub-groups each having one or more key terms, at least one of the sub-groups having key terms that have a higher similarity level than the key terms in the original group; a determination is made as to associations between the one or more negative key terms and the two or more sub-groups; and the two or more sub-groups of key terms and associated zero or more negative key terms are provided.

Implementations may have one or more of the following features. Automatically classifying the group of key terms includes automatically classifying the key terms such that an average semantic distance between key terms in at least one of the sub-groups is smaller than an average semantic distance between the key terms in the original group. In some examples, automatically classifying the key terms includes identifying N-grams each being common to some of the key terms, and classifying the group based on the N-grams. In some examples, automatically classifying the key terms includes identifying semantic clusters of the key terms. In some examples, identifying semantic clusters of the key terms includes constructing a graph to represent relationships among the key terms, and reducing the graph. In some examples, identifying semantic clusters of the key terms includes determining whether to merge two key terms into a sub-group based on predetermined clusters in a semantic database that are associated with each key term. Automatically classifying the group into two or more sub-groups includes classifying the group into two or more sub-groups of positive key terms without considering the negative key terms. Information is provided regarding which one or more sub-groups of key terms are classified based on N-grams, and which one or more sub-groups of key terms are classified based on semantic clustering.

In general, in another aspect, a group of key terms associated with an ad campaign is identified, each key term including a keyword or a key phrase, the ad campaign being associated with one or more creative items; the group is automatically classified into two or more sub-groups each having one or more key terms, at least one of the sub-groups having key terms that have a higher similarity level than the key terms in the original group; associations between the one or more creative items and the two or more sub-groups are determined; and the two or more sub-groups of key terms and associated zero or more creative items are provided.

Implementations may have one or more of the following features. Automatically classifying the group of key terms includes automatically classifying the key terms such that an average semantic distance between key terms in at least one of the sub-groups is smaller than an average semantic distance between the key terms in the original group. Automatically classifying the key terms includes identifying N-grams each being common to some of the key terms, and classifying the group based on the N-grams. Automatically classifying the key terms includes identifying semantic clusters of the key terms.

In general, in another aspect, an ad campaign suggestion engine identifies a group of key terms associated with an ad campaign and automatically classifies the group into two or more sub-groups each having one or more key terms, each key term including a keyword or a key phrase, at least one of the sub-groups having key terms that have a higher similarity level than the key terms in the original group. The ad campaign suggestion engine also determines associations between one or more negative key terms and the two or more sub-groups, the one or more negative key terms being associated with the ad campaign.

Implementations may have one or more of the following features. The ad campaign suggestion engine calls a semantic database to obtain information about relationships among at least some of the key terms. The ad campaign suggestion engine includes an N-gram classification engine that identifies N-grams each being common to some of the key terms, and classifies the key terms based on the N-grams. The ad campaign suggestion engine includes a semantic clustering engine that identifies semantic clusters of the key terms. The semantic clustering engine includes a graph reduction engine that constructs a graph having vertexes and edges between the vertexes, and reduces the graph, wherein each vertex represents a key term, and each edge indicates a relationship between key terms connected by the edge. The semantic clustering engine includes an agglomerative clustering engine that determines whether to merge two key terms into a sub-group by identifying predetermined clusters in a semantic database that are associated with each key term, and determining similarities between the two key terms based on the predetermined clusters associated with the key terms.

In general, in another aspect, an ad campaign suggestion engine identifies a group of key terms associated with an ad campaign and automatically classifies the group into two or more sub-groups each having one or more key terms, each key term including a keyword or a key phrase, at least one of the sub-groups having key terms that have a higher similarity level than the key terms in the original group. The ad campaign suggestion engine also determines associations between one or more creative items and the two or more sub-groups, the one or more creative items being associated with the ad campaign.

Implementations may have one or more of the following features. The ad campaign suggestion engine calls a semantic database to obtain information about relationships among at least some of the key terms. The ad campaign suggestion engine includes an N-gram classification engine that identifies N-grams each being common to some of the key terms, and classifies the key terms based on the N-grams. The ad campaign suggestion engine includes a semantic clustering engine that identifies semantic clusters of the key terms.

These and other aspects and features, and combinations of them, may be expressed as methods, apparatus, systems, means for performing functions, program products, and in other ways.

The systems and methods disclosed herein may have one or more of the following advantages. Each ad can be associated with a more focused group of keywords so that the ad keywords are more closely matched with search query keywords submitted by users, and thus the ad can be more relevant to the users. Publishers of web pages that include the ads can generate more revenue by displaying ads that are more relevant to users. The classification of keywords into smaller groups can be performed automatically so that a large number of ad campaigns can be optimized efficiently.

DETAILED DESCRIPTION

1. System Overview

Figure 1:
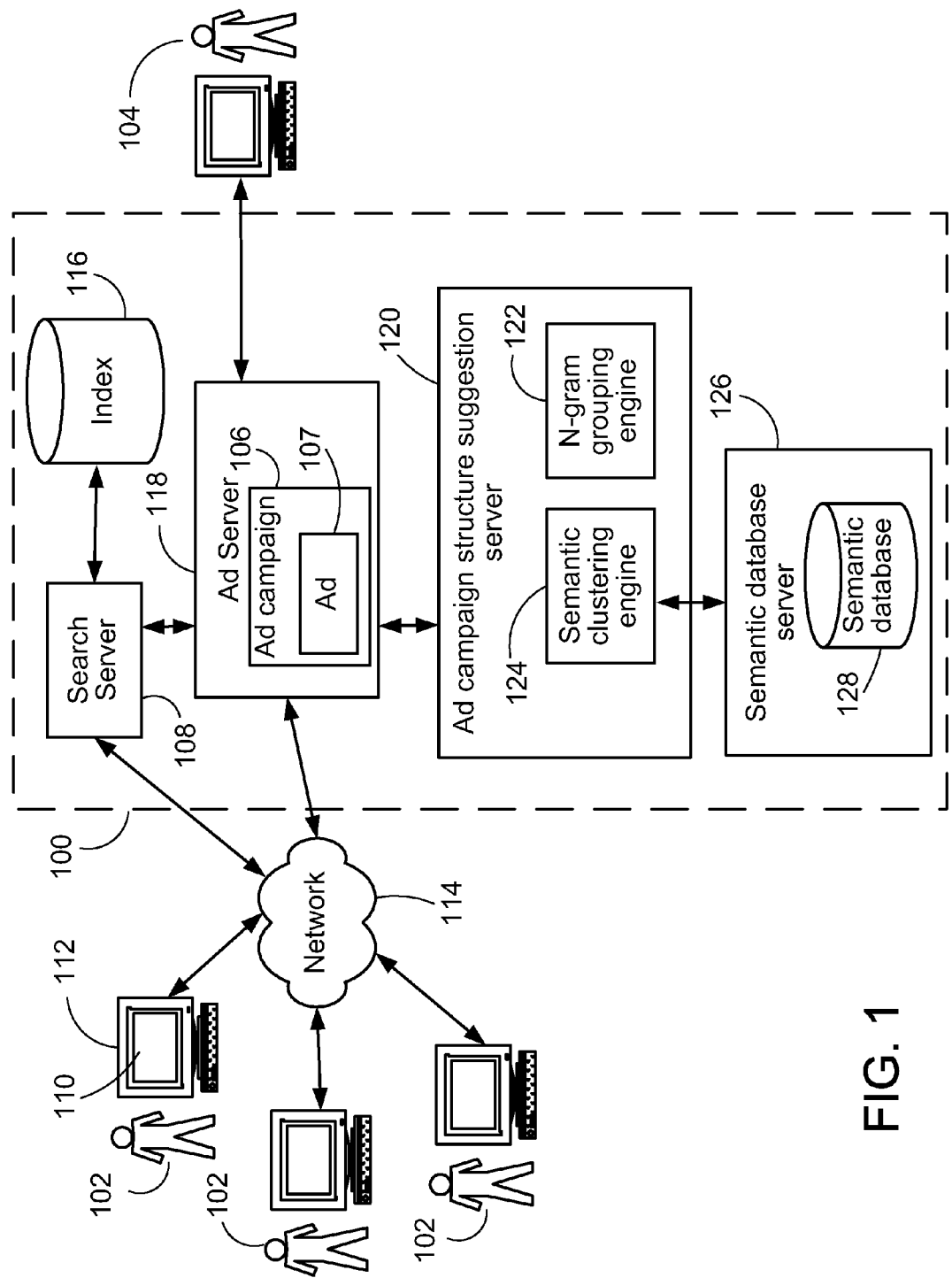
FIG. 1 shows a schematic diagram of an example information retrieval system.

FIG. 1 shows a schematic diagram of an example information retrieval system 100 for retrieving and displaying information (e.g., web documents) and content (hereinafter referred to as advertisements or simply ads) that match search queries submitted by users 102. The system 100 provides suggestions to advertisers 104 (sponsors of the ads) on structures of ad campaigns 106 hosted on an ad server 118. For example, an ad campaign 106 is initially associated with a group of keywords and/or key phrases such that ads 107 of the campaign 106 are delivered when search queries include those keywords and/or key phrases. The system 100 analyzes the group of keywords and/or key phrases and may group them into two or more sub-groups each having a smaller number of keywords and/or key phrases such that the keywords and/or key phrases within a sub-group have a higher level of semantic similarity to one another than the original larger group.

By grouping the large number of keywords and/or key phrases into sub-groups each having a smaller number of keywords and/or key phrases, the ads 107 can be targeted more accurately, potentially generating more revenue to the advertisers 104 and publishers of web pages that include the ads 107. For example, ad keywords and/or key phrases can be more closely matched with search query keywords and/or key phrases submitted by the users 102 so that the ads 107 can be shown to people who feel that the ads 107 are relevant to the information that they are looking for, and hence are more likely to click on or otherwise act upon the ads 107. The system 100 can automatically analyze a large number of ad campaigns and group the keywords and/or key phrases of each ad campaign, if feasible, into smaller sub-groups so that a large number of ad campaigns can be improved efficiently.

The ad campaign 106 can have one or more "creatives," which refer to the visual, audio, video, or combination thereof representation of the ads 107. The visual representation can include, e.g., a headline, a description of the content of the ad 107, and one or more images associated with the ad 107. After the system 100 groups the keywords and/or key phrases into two or more sub-groups of keywords and/or key phrases, the system 100 also provides suggestions on which creative is matched with each sub-group of keywords and/or key phrases.

In the description below, "term" can mean "word" or "phrase". Each phrase can include two or more words. "Key term" is used to mean "keyword" or "key phrase", and "key terms" is used to mean "keywords and/or key phrases". Thus, two key terms can mean two keywords, two key phrases, or a keyword and a key phrase. For example, when an ad is associated with "car" and "hybrid vehicle", each of "car" and "hybrid vehicle" is referred to as a key term associated with the ad. Similarly, a "search term" can mean a word or a phrase in a search query. When a user submits a search query looking for information about "pie" and "apple sauce", each of "pie" and "apple sauce" is referred to as a search term in the search query.

The system 100 includes a search server 108 that enables the users 102 to search for information using a keyword search. The user 104 uses a web browser 110 executing on a client machine 112 (e.g., personal computer or a mobile phone) to access the search server 108 through a network 114 (e.g., Internet). The user 104 sends a search request that includes a search query to the search server 108, in which the search query includes one or more search terms. In response, the search server 108 searches an index 116, returns a list of pages that match the search query submitted by the user 104, and provides the list of pages in a sequence according to rank scores of the pages. The search server 108 also causes ads 107 to be displayed alongside the list of returned pages. Other search configurations, content and methodologies are possible.

The ad server 118 stores information about ad campaigns 106. Each ad campaign 106 can include one or more ad groups, and each ad group can include one or more ads that are targeted to a group of key terms or websites. The ad campaign 106 includes metadata associated with the one or more ads. The metadata includes, for example, a group of key terms and information about budgets for ads, geographical locations for targeting the ads, languages for targeting the ads, web sites for targeting the ads, and end dates for the ads, etc.

The system 100 includes an ad campaign structure suggestion (ACSS) server 120 that analyzes the ad campaign 106 and provides suggestions on grouping of the key terms in the ad campaign 106. Upon receiving a request to optimize the ad campaign 106, the ACSS server 120 analyzes the group of key terms associated with the ad campaign and, if feasible, groups the key terms into two or more sub-groups that are more focused than the original group. If the ad campaign 106 has more than one creative item (e.g., creative text or image), the ACSS server 120 provides suggestions on which creative item or items are associated with each sub-group. If the ad campaign 106 is already optimized, then no further grouping of the key terms is necessary.

In one implementation, the ACSS server 120 includes an N-gram grouping engine 122 and a semantic clustering engine 124. An N-gram refers to a word or a set of N words. For example, the word "dog" is a common N-gram for the set of words "dog catcher", "dog collar", "top dog", "dog days", "dog bowl", "dog treat", "dog groomer", and "dog breeder". The phrase "dog walking service" is a common N-gram for the set "cheap dog walking service", "inexpensive dog walking service", "dog walking service", "cat and dog walking service", and "dog walking service worker". The N-gram grouping engine 122 groups the key terms based on N-grams that are common to certain key terms to form sub-groups each including key terms having a common N-gram.

The semantic clustering engine 124 groups the key terms based on information about relationships among the key terms, such as how closely related or opposite they are. The information can be obtained from a semantic database 128 maintained by a semantic database server 126. For example, the server 126 can employ a data clustering technology that uses noisy-OR Bayesian networks to associate sets of data with clusters. The semantic database server 126 can provide various kinds of information in the semantic database 128, such as semantic distances that represent a measure of relationships between words.

For example, the semantic database server 126 and the semantic database 128 can be implemented using the technology described in U.S. patent application Ser. No. 10/676, 571, titled "Method and Apparatus for Characterizing Documents Based on Clusters of Related Words," and U.S. Pat. No. 7,231,393, titled "Method and Apparatus for Learning a Probabilistic Generative Model for Text," the contents of which are incorporated by reference.

In one implementation, the semantic database 128 includes predetermined clusters, each cluster including terms (e.g., words or phrases) that have certain relationships. Each cluster can be identified by a cluster number. Terms that are associated with the same cluster numbers are more likely to be related in some way than terms that do not share any common cluster numbers. Each term can be associated with one or more clusters. For example, when provided with a query term, the semantic database server 126 can provide a set of clusters (represented by their cluster numbers) associated with the term, and a set of "activation weights". Each activation weight indicates the strength of association between the term and one of the clusters. The semantic database server 126 can also provide a list of words that are more strongly associated with a cluster, or a group of clusters. Such a list of words is referred to as a "smooth distribution" list. In this description, each of the predetermined clusters in the semantic database 128 is referred to as a "topic cluster", and the term "semantic cluster" is used to refer to the clusters that are generated by the ACSS server 120 (e.g., using the N-gramming and semantic clustering algorithms described below).

In some implementations, the ACSS server 120 groups positive key terms and negative key terms in separate steps. Negative key terms are used to specify that an ad should not appear when the search queries include the negative key terms. For example, an ad for hardware that is targeted toward home owners can be associated with negative key terms such as "contractor" and "contractor hardware stores". This prevents the ad from being shown with web pages of contractor-specific hardware stores.

The advertisers 104 can use the information about the sub-groups of key terms to improve the ad campaign 106. The advertiser 104 can accept the suggestions from the sever 120 regarding the sub-groups of key terms, upon which the server 120 automatically restructures the advertiser's ad campaign 106. Alternatively, the advertiser 104 can further manually refine the grouping of key terms. Because the sub-groups of key terms have more focused themes than the original group, the matching of ads with search queries can be improved, users 102 can receive more relevant ads, the conversion rates of the ads may improve, and the advertisers 104 and publishers of web pages that include the ads may receive more ad revenue.

The network 114 can be a local area network (LAN), a wide area network (WAN), the Internet, any other type of network, or any combination of types of networks.

2. Ad Campaign Structure Suggestion Server

Figure 2:
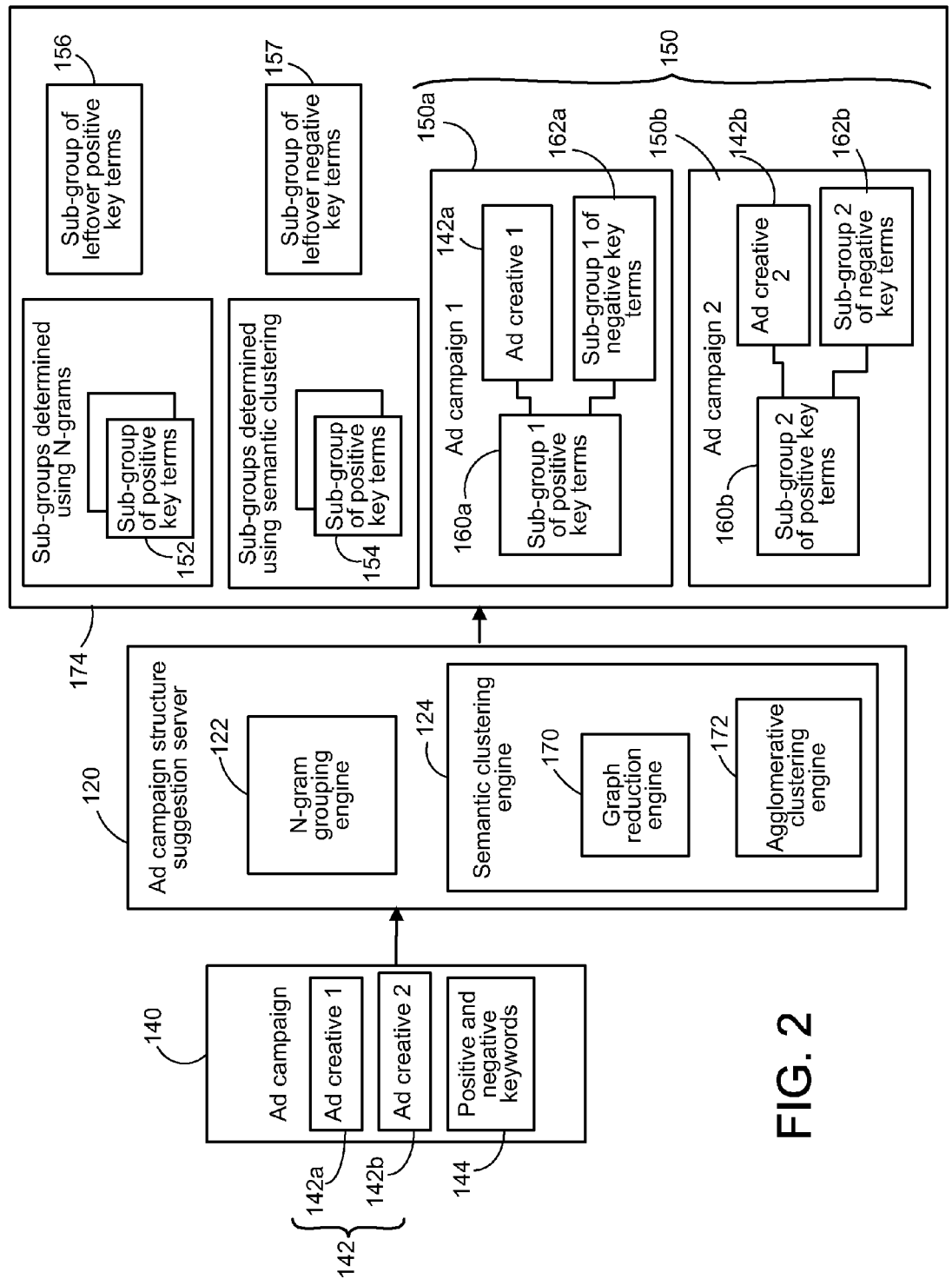
FIG. 2 is a block diagram of an example ad campaign structure suggestion server.

Referring to FIG. 2, in some implementations, the ACSS server 120 receives input data for an ad campaign 140 and groups key terms associated with the ad campaign 140. The input ad campaign 140 can include one or more ad creatives (e.g., ad creative 142a and ad creative 142b, collectively referenced as 142), and associated positive and negative key terms 144. In one implementation, when deciding whether grouping the key terms into smaller sub-groups will improve the ad campaign 140, the ACSS server 120 analyzes the positive key terms without regard to the negative key terms. If the ACSS server 120 determines that the positive key terms are already optimized, the ACSS server 120 outputs a message indicating that no further grouping of the key terms is necessary. If the ACSS server 120 determines that the number of positive key terms is too large and can be optimized by forming sub-groups, the ACSS server 120 processes the ad campaign data using the method described below and outputs data 174 for improved ad campaigns (e.g., 150a and 150b, collectively referenced as 150).

The ACSS server 120 uses various clustering algorithms for forming clusters (or sub-groups) of key terms. In addition to outputting the optimized ad campaigns 150, the ACSS server 120 also outputs the sub-groups of key terms determined by each clustering algorithm. For example, as described above, the ACSS server 120 includes the N-gram grouping engine 122 and the semantic clustering engine 124. The semantic clustering engine 124 includes, for example, a graph reduction engine 170 and an agglomerative clustering engine 172. After analyzing the positive key terms using the N-gram grouping engine 122 and the semantic clustering engine 124, the ACSS server 120 outputs sub-groups of positive key terms 152 determined by the N-gram grouping engine 122, sub-groups of positive key terms 154 determined by the semantic clustering engine 124, a sub-group of leftover positive key terms 156, and a sub-group of leftover negative key terms 157. The sub-groups 152 can include one or more sub-groups, and the sub-groups 154 can include one or more sub-groups.

The ACSS server 120 provides suggestions on associations between the ad creatives 142 and the sub-groups of positive key terms, as well as associations between the negative key terms and the sub-groups of the positive key terms. For example, the ACSS server 120 may suggest that the first ad creative 142a and a first sub-group of negative key terms 162a be associated with a first sub-group of positive key terms 160a. The ACSS server 120 may suggest that the second ad creative 142b and a second sub-group of negative key terms 162b be associated with a second sub-group of positive key terms 160b. The sub-group of positive key terms 160a (or 160b) can be one of the sub-groups 152 or 154.

In some implementations, the ACSS server 120 processes the input ad campaign 140 in three phases. In the first phase, the N-gram grouping engine 122 classifies the positive key terms into one or more sub-groups. The N-gram grouping engine 122 divides a group of key terms into sub-groups that resemble human word groupings. Key terms that are identified as having common N-grams are removed from the pool of key terms upon which the second phase of clustering operates.

In the second phase, the semantic clustering engine 124 processes the positive key terms that were not placed in the sub-groups in the first phase, and forms semantic clusters (sub-groups) of terms. The semantic clusters can be formed using a graph reduction method, which includes constructing a graph to represent relationships among the key terms, and reducing the graph. The graph can have vertexes and edges between the vertexes, each vertex representing a key term, each edge indicating a relationship between the key terms connected by the edge. Each edge can be associated with a weight representing a strength of the relationship (e.g., semantic distance) between the key terms connected by the edge.

In some implementations, the graph can be reduced by finding and removing a bridge edge or an articulation vertex to separate the graph into two separate sub-graphs. Once the initial graph has been constructed, the graph reduction engine 170 processes the graph using an iterative graph reduction process by identifying clusters of vertexes in the graph that represent distinct semantic groupings of words. The graph reduction engine 170 finds and breaks bridge edges, finds and splits articulation point vertexes, and/or deletes lowest-weight graph edges. When deleting the lowest-weight graph edges, a threshold may be set such that a lowest-weight graph edge is deleted only if it has a weight that is less than a threshold value. The threshold value can be determined based on the maximum weight of the graph, e.g., the threshold value can be lower when the maximum weight is lower, and vice versa. The process of reducing the graph ends when the maximum of the weights associated with the edges is less than a threshold.

The semantic clusters can also be formed using a dot product based agglomerative clustering method. Each key term is initially placed in a distinct group by itself. The semantic database server 126 is accessed to obtain a set of cluster identifiers (IDs) associated with each group and the strength of the associations between the terms and the cluster IDs. Each group can also include a "smooth distribution list" of words (and associated weights) that are strongly associated with the clusters of each group.

Two groups having a similarity level above a threshold can be merged together. The similarity of two groups can be determined using a function that is similar to a dot product that uses, for example, both cluster IDs and terms from the smooth distribution lists. The merging of two groups can be performed by combining the key terms, the semantic clusters (with weights), and the smooth distribution terms (with weights). In cases where the same cluster (or smooth distribution term) is present in both groups being merged, the average weight can be calculated for the aggregate group.

In cases where the two groups being merged are of roughly equivalent size, the clusters (and weights) and the smooth distribution terms (and weights) can be obtained by sending a new query containing the new key terms to the semantic database server 126. When two groups of approximately the same size are joined, the semantic meaning of the aggregate can change slightly, e.g., becoming more precise. The subsequent requests to the semantic database sever 126 can improve the quality of the classification process.

The process of group merging continues until no progress can be made, for example, when all groups are sufficiently dissimilar with their peers such that no similarity score surpasses the merger threshold and thus no further joining of groups occurs. The groups with more than one key term represent the results of semantic clustering, and the groups with only one key term are rolled together into a leftovers group. At the end of the second phase, the group of key terms has been separated into several sub-groups. Each of the sub-groups can be used to create a new ad group in the campaign.

In the third phase, the ACSS server 120 determines which existing creative and negative keywords are associated with each new sub-group of positive key terms. Creatives and negative key terms are associated with new positive key term sub-groups in a way that maximizes creative-to-subgroup relevance. For each sub-group of positive key terms formed by the N-gramming and semantic clustering algorithms, some subset of the original creatives may be more relevant than others, and the relevant subset of creatives is associated with the new sub-group of positive key terms. Similarly, some negative key terms may be more relevant to a certain new sub-group of positive key terms, and the relevant negative key terms are associated with the new sub-group. If a "leftovers" group is formed in the second phase, the "leftovers" group is associated with all creatives and the negative key terms from the original ad group.

3. Graphical User Interfaces

Figure 3:
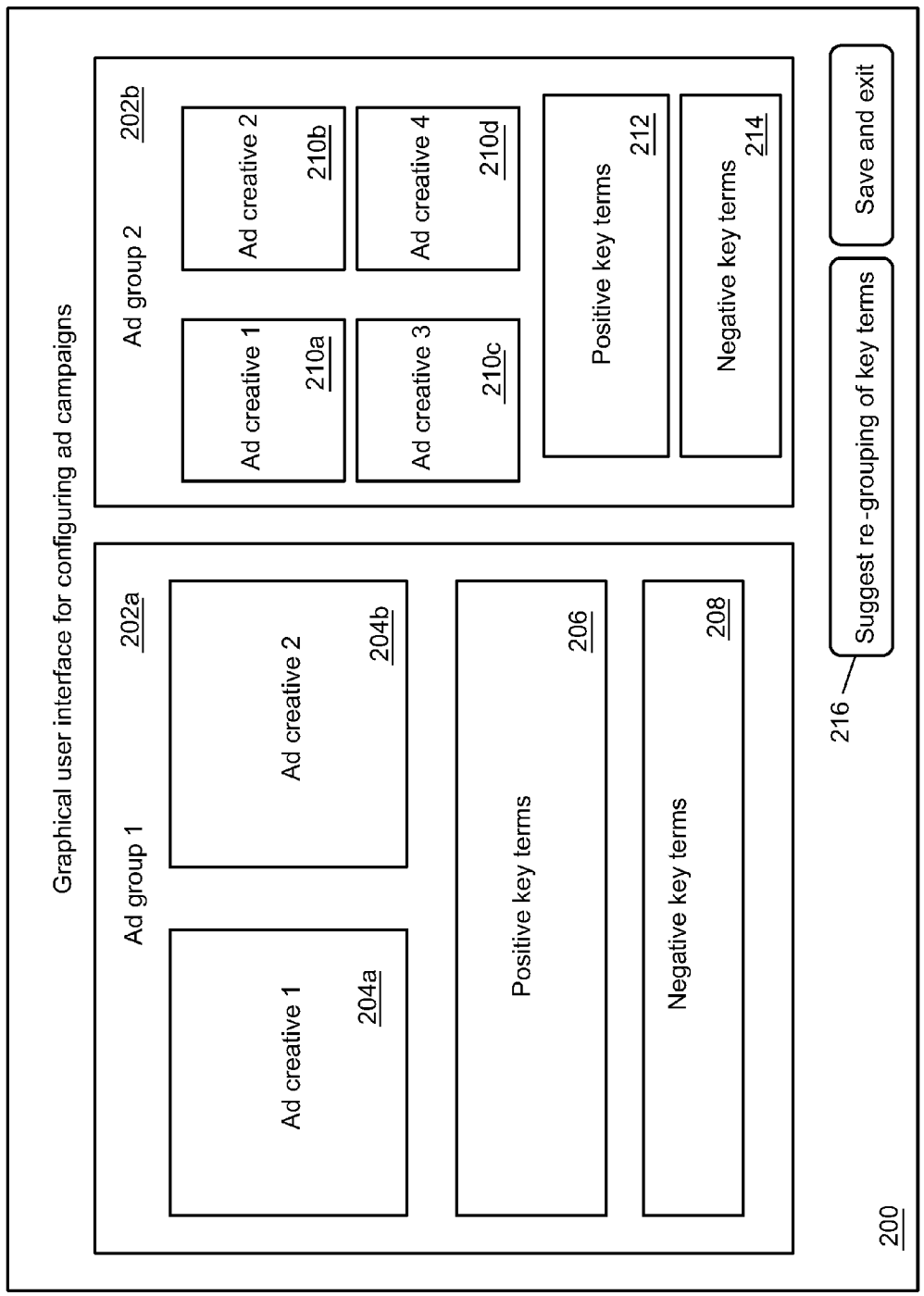
FIGS. 3 and 4 are diagrams of example graphical user interfaces.

Referring to FIG. 3, the ad server 118 (FIG. 1) provides a graphical user interface (GUI) 200 that allows the advertiser 104 to set up new ad campaigns or modify existing ad campaigns. The GUI 200 displays the ad campaign structure before being processed by the ACSS server 120. The GUI 200 allows the advertiser 104 to specify one or more ad groups (e.g., 202a and 202b), creatives (e.g., 204a, 204b, 210a-210d), and key terms (e.g., 206, 208, 212, 214) associated with the ad groups. The GM 200 allows the advertiser 104 to request suggestions on grouping of the key terms, for example, by clicking on a button 216.

When the advertiser 104 requests suggestions on re-grouping of key terms, the ad server 118 sends information about the ad campaign set up by the advertiser 104 to the ACSS server 120. The ACSS server 120 analyzes the ad campaign data and returns data for an improved ad campaign (similar to 174 of FIG. 2) to the ad server 118.

Figure 4:
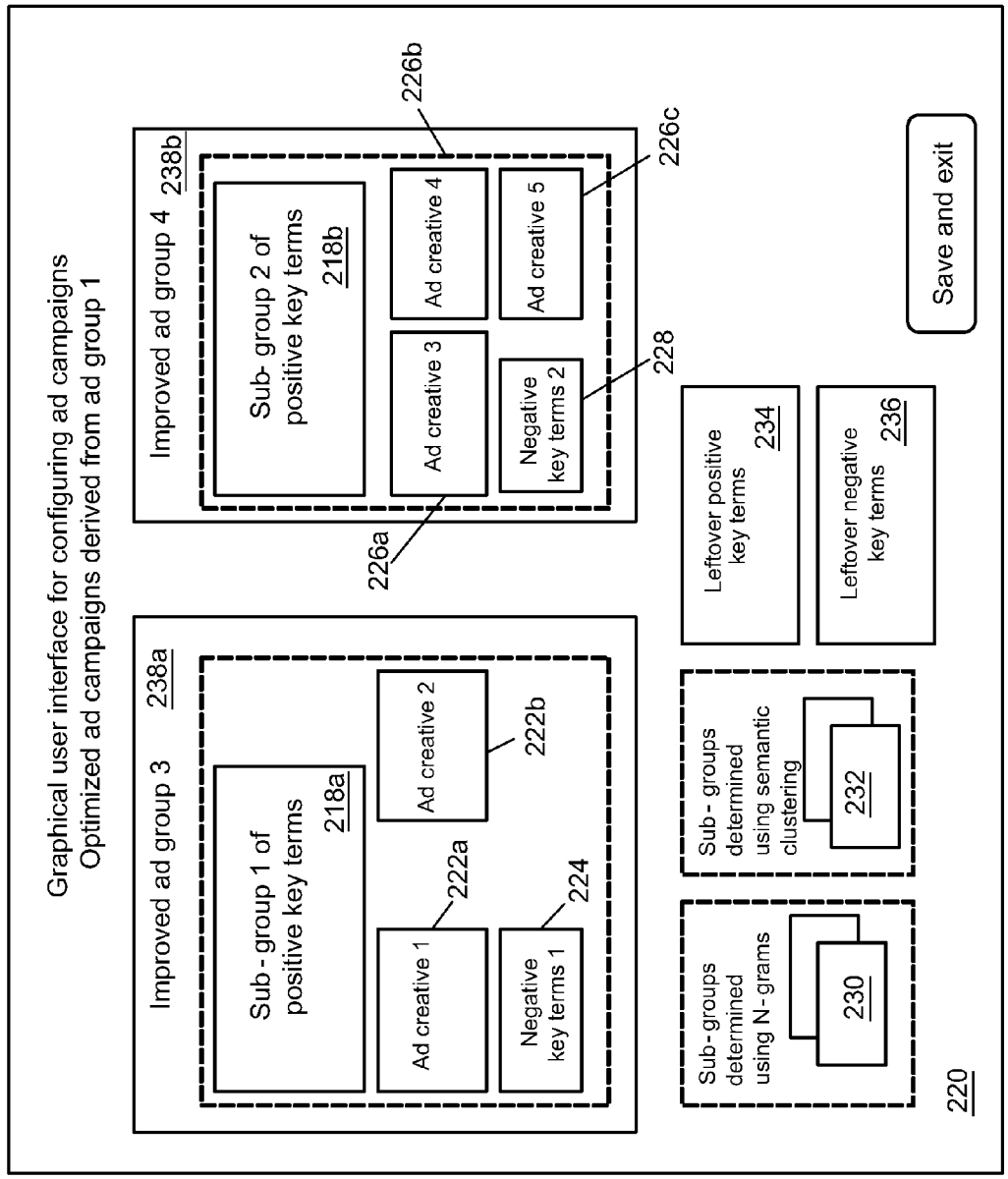

Referring to FIG. 4, the ad server 118 provides a GUI 220 for displaying the optimized ad campaign structure. The GUI 220 shows new ad groups 238a and 238b formed by new sub-groups of positive key terms, and the ad creative and negative key terms that are associated with each ad campaign. In this example, the ACSS server 120 divided the positive key terms of the first ad group 202a into two sub-groups 218a and 218b. The first sub-group 218a of positive key terms is associated with subgroups 222a and 222b of ad creatives, and a sub-group 224 of negative key terms. The second sub-group 218b of positive key terms is associated with ad creatives 226a to 226c and a sub-group 228 of negative key terms. The GUI 220 also shows sub-groups 230 of positive key terms that are determined using N-grams, sub-groups 232 of positive key terms that are determined using semantic clustering, a sub-group 234 of leftover positive key terms, and a sub-group 236 of leftover negative key terms.

4. N-Gram Grouping

The following describes an example of the first phase of processing the input data 140 by the ACSS server 120, in which positive key terms 144 are classified using N-gram grouping. The first phase can include several sub-phases, such as pre-processing, building a tree of N-gram groups, and post-processing. Various modifications can be made to N-gram grouping algorithm.

The pre-processing step identifies and joins multi-word phrases. For example, phrases such as "New York", "New Mexico", and "New Hampshire" are not grouped by the N-gram word "New" alone. Instead, the phrases are treated as compound words (i.e., "New-York") by the N-gram grouping engine 122. Candidate multi-word phrases can be identified using, for example, the semantic database 128, a dictionary of phrases, and/or a large hash table, which can include multi-word geographic place names at various levels (e.g., city, state, etc.).

The N-gram grouping engine 122 classifies key terms into sub-groups each having a common N-gram. The engine 122 is configured to understand word stemming and treats, e.g., "cat" and "cats" equivalently. Each key term can belong to more than one sub-group. The output of the N-gram grouping engine 122 can be a set of zero or more N-gram groups and zero or one "leftovers" group. Each N-gram group can have a name that includes a word or phrase that is the common N-gram of the key terms in the group. The "leftovers" group may have no name and contains key terms that do not fall into any N-gram group.

All possible N-gram groups are identified and processed to determine which N-gram groups are suitable for forming sub-groups of key terms. For example, some N-gram groups may have key terms that are duplicated entirely by smaller N-gram groups, some N-gram groups may have key terms that are identical to other N-gram groups, some N-gram groups may be too large, and some N-gram groups may be too small.

A "tree" of N-gram groups is built from the initial N-gram groups. Each of the initial N-gram groups is added to a tree data structure according to certain rules. For example, one rule may specify that if the N-gram group being added is identical to a group already present in the tree, the group with the shorter name is deleted. Another rule may specify that if the N-gram group being added is a proper subset of a group already in the tree, the key terms that overlap are deleted from the group already in the tree. Another rule may specify that, if any group in the tree is a proper subset of the N-gram group being added to the tree, the key terms that overlap are deleted from the group being added to the tree. When all key terms are deleted from a group, that group is deleted from the tree. In the rules specified above, key terms are deleted only when the group is a proper subset of another group, so it may be possible for one key term to be present in more than one group in the tree.

Below are examples of key terms related to prepaid calling cards:
- cheap calling card Argentina;
- nice calling card Argentina;
- free calling card Argentina;
- cheap calling card Brazil;
- nice calling card Brazil;
- free calling card Brazil;
- cheap calling card Canada;
- nice calling card Canada;
- free calling card Canada;

and so forth for numerous other countries. One way to group the key terms is by country (e.g., "Canada", "Brazil", etc.). Another way to group the key terms is by terms such as "cheap", "free", and "nice", etc. When the key terms related to calling cards listed above are processed using the tree algorithm described above, the result may include groups that are formed based on terms such as "cheap", "free", "nice", "Argentina", "Canada", and "Brazil", etc., with some duplicate terms in different groups. In some implementations, the system can employ more complicated rules, such as one that prefers geographic groupings over adjective groupings.

After the tree has been built, the remaining N-gram groups are processed by:

(1) eliminating N-gram groups that are based only on stop-words (e.g., in English, words such as "a", "the", or "of");

(2) joining N-gram groups with names that are permutations of each other;

(3) joining N-gram groups that are synonyms of each other;

(4) moving key terms from less specific groups to more specific groups;

(5) eliminating very large and very small groups; and (6) regenerating a leftovers group (e.g., that includes key terms not included in an N-gram group).

When identifying groups based on N-grams, it is possible to have two or more N-gram groups with names that are permutations of each other. For instance, "fast cool cars" and "cool fast cars" may be the names of two similar N-gram groups that are populated based on the order of key words in a phrase. In order to identify groups whose names are permutations of each other, a "fingerprint" of each N-gram group name is computed. For example, the fingerprint can be a checksum based on the letters in the group name, the length of words in the group name, the number of words in the group name, and the letter count or frequency in the group name. White space and stopwords can be ignored when computing the fingerprint.

Identically named groups that are permutations of each other may have the same checksum. Groups with names that contain only stopwords can be assigned a checksum with the value zero. After checksums have been assigned to each group name, groups with the same checksum can be combined and groups with a zero checksum can be eliminated.

The next stage of post-processing includes identifying synonymously named groups and combining them, relying on a large table of synonyms (e.g., in many languages in many contexts). For example, each word in each group name can be provided to a synonym iterator that returns the synonyms of the word. Using each synonym, new hypothetical group names can be constructed, and each hypothetical group name can be compared with other N-gram group names. If a match is found, the two groups can be combined. The synonym iterator can be configured to avoid looking up numbers or geographic place names in the synonym table. For example, a number such as "7" may have synonyms of "6" and "8", and a place name such as "Kirkland" may have synonyms such as "Bellevue" and "Redmond" (which are geographically proximate cities in Washington State). Use of such synonyms of numbers or place names returned by the synonym iterator may result in merger of groups that are not closely related.

During the post-processing, key terms can be moved from general groups to more specific groups. For example, each key term in every group is provided to the synonym iterator. The checksum of the key term is computed using the same algorithm that was previously used to identify and combine permuted group names. Using synonym variants of the key term under consideration and its checksum, data can be compared with other N-gram group names. If a key term is a permutation of a group name, the key term is moved to the group. If a key term is a synonym of a group name, the key term is moved to the group if the group that presently contains the key term has fewer words in the title than the new group. Because key terms may be moved out of a group in this step, it may be possible for groups to shrink in size. If a group contains zero key terms, the group is deleted.

Another post-processing step includes finding and eliminating groups that are either very big or very small. For example, for very large groups (e.g., six times the size of the smallest group), any key term in the large group that is also contained in another group can be eliminated. This causes the large group to shrink in size. If every key term in the large group is also contained in another group, then the large group is eliminated.

For very small groups, defined as a group that has less than a preset number (e.g., 5) of key terms, the system can attempt to move key terms from the small group to other groups and delete the small group. For example, key terms in a small group are moved to groups with names that contain the key terms. After attempts are made to move each term in the small group to other groups (whether successful or not), the small group is deleted.

The final stage of N-gramming includes forming a leftovers group by collecting all of the key terms not present in any N-gram group. Because the leftovers group captures the key terms deleted from the N-gram groups during post-processing, the post-processing can be less restrictive in deleting groups and key terms. A key term that is deleted and not present in any N-gram group is not lost and will appear in the leftovers group.

Once a key term is part of an N-gram group, it is no longer a candidate for further clustering, and can be removed from the pool of key terms to be processed by semantic clustering described below. In some examples, when a larger group of terms is split into two or more smaller N-gram groups, the average semantic distance between terms in at least one of the N-gram group is smaller than the average semantic distance between the terms in the original larger group.

5. Semantic Clustering

In the second phase of clustering, semantic clusters of words are formed. Two example algorithms for forming semantic clusters are described below.

5.1 Divisive Clustering Via Graph Reduction

Figure 5:
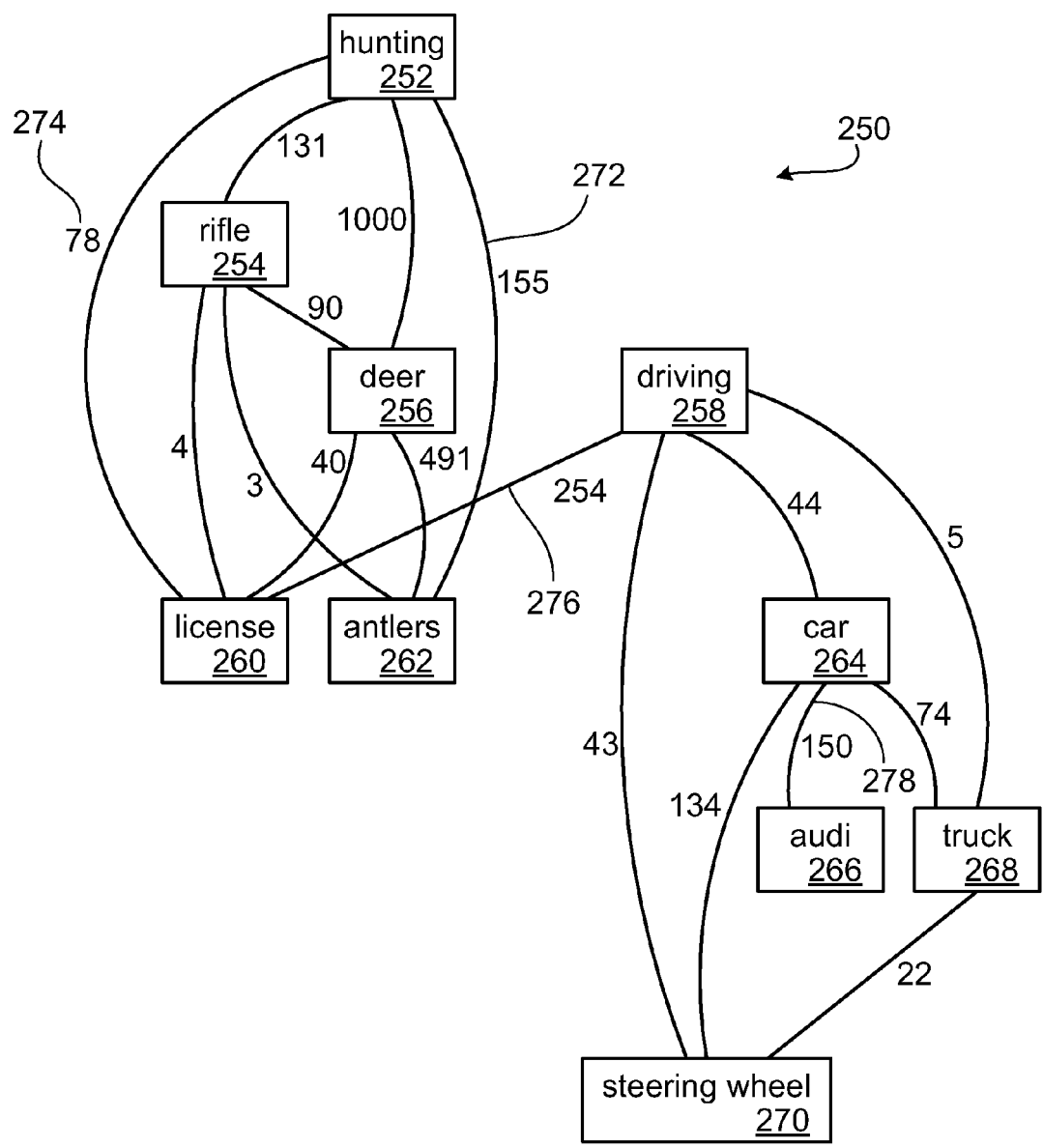
FIGS. 5 and 6 are diagrams of example graphs that include vertices connected by edges.

One example algorithm for semantic clustering involves processing of a weighted graph. For example, FIG. 5 shows a graph 250 that includes vertexes 252 through 270 connected by edges (e.g., 272). Each vertex 252 through 270 represents a key term of an ad campaign. Each edge represents a relationship between the two key terms in the vertexes connected by the edge. Each edge is associated with a weight (e.g., 274). The weight of an edge in the graph 250 represents the strength of the relationship between the corresponding key terms. For example, the weight "78" 274 of the graph edge between vertexes 252 and 260 represents the strength of the association between the key terms "hunting" and "license". The weights can be configured such that heavier weight edges express a stronger relationship between terms. The precise formula used to assign weights to graph edges can include several weighted terms.

In an alternative example, each edge can be associated with a "semantic distance" representing the "distance" between two terms connected by the edge. Terms that are more closely related have a smaller semantic distance, and vice versa. The weights or semantic distances between terms can be obtained by consulting the semantic database 128 or derived from information obtained from the semantic database 128. Methods of determining the weights or the semantic distances are described in U.S. patent application Ser. No. 10/676,571, titled "Method and Apparatus for Characterizing Documents Based on Clusters of Related Words", and U.S. Pat. No. 7,231,393, titled "Method and Apparatus for Learning a Probabilistic Generative Model for Text".

To generate the graph 250, a list of key terms that are not part of any N-gram group identified in phase one of the clustering process, for example, the leftovers group, is used as an input list to the semantic clustering engine 124. The engine 124 calls the semantic database server 126 to obtain cluster numbers (of topic clusters) associated with each key term, a smooth distribution list of a number of words for each cluster, and a set of "links".

As described above, the cluster numbers describe some semantic grouping of words. Vertexes representing key terms that share one or more semantic clusters are connected in an initial graph by edges. Each cluster number associated with a key term is also associated with an "activation weight", which provides an estimate of how strongly related the key term is to the topic cluster represented by the cluster number. The weight of an edge in the initial graph that joins two vertexes is determined in part by the activation weight of each vertex's key term in the common semantic clusters.

The smooth distribution list includes a set of terms (e.g., 50 terms) that are most strongly related to a particular semantic cluster or to a set of semantic clusters.

"Links" are clusters computed by the semantic database server 126 that apply to more than one key term in the input. Each link includes a cluster number, a set of key terms associated with the cluster, and firing weights each describing numerically how strongly the cluster is associated with each key term. The links and associated firing weights can be used in building the initial graph edges.

After the initial graph has been constructed, a work queue that holds graphs is formed and populated with the initial graph. A finished queue that holds finished graphs is formed and is initially empty.

Figure 6:
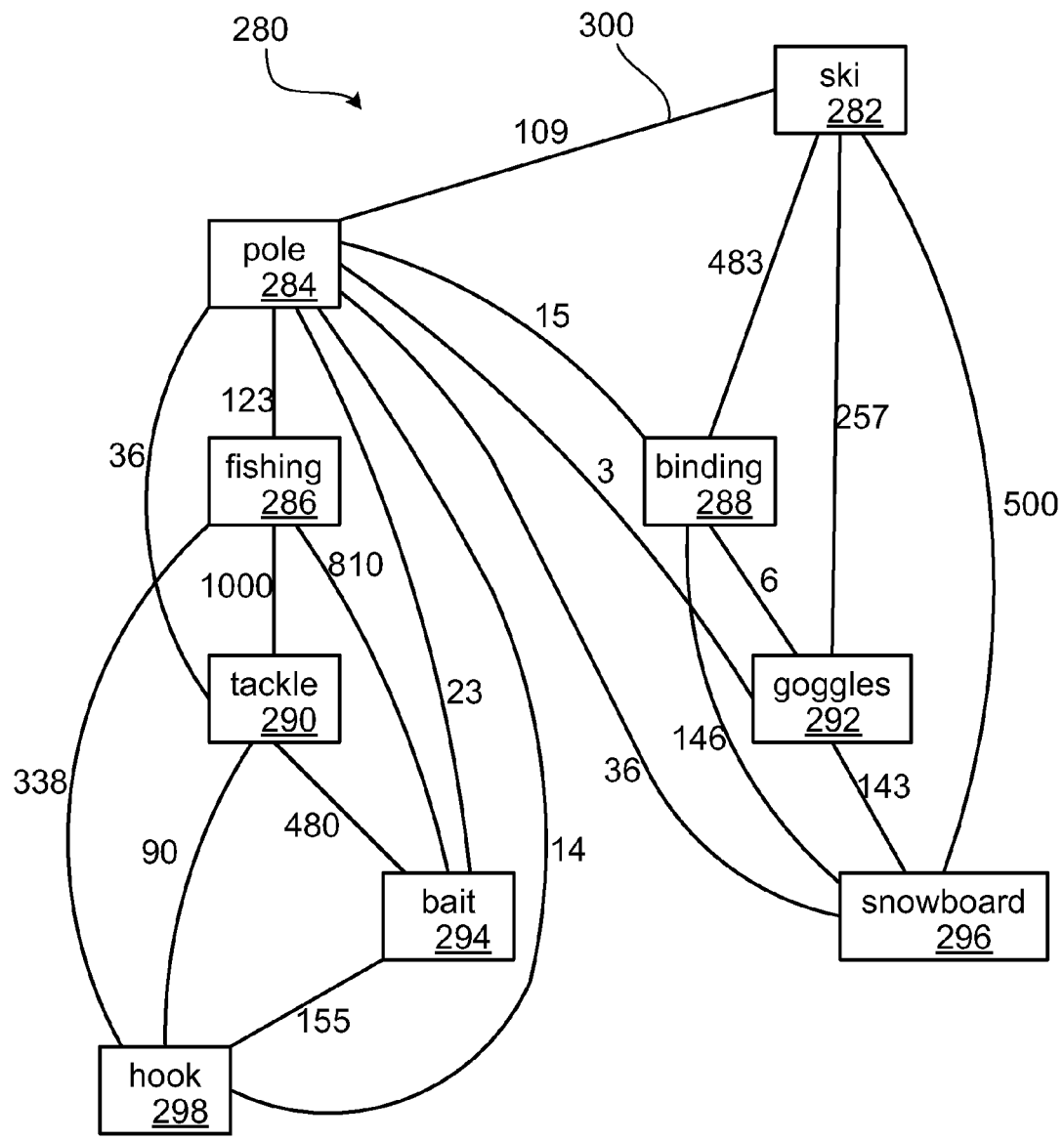

FIG. 6 shows a graph 280 that includes vertexes 282 through 298 connected by edges (e.g., 300). Each vertex 282 through 298 represents a key term of an ad campaign.

Some terms used in this description are defined as follows:

A "bridge edge" (or simply "bridge") in a graph is an edge that, if removed, would break the graph into two disjoint sub-graphs. If there are two groups of (one or more) vertexes that are joined by only one edge, that edge is a bridge edge. In the graph 250 of FIG. 5, there are two bridge edges: the edge 276 between "driving" 258 and "license" 260 is a bridge, as well is the edge 278 between "car" 264 and "audi" 266.

An "articulation point" is similar to a bride edge. An articulation point is a vertex that, if removed, would break the graph into two or more disjoint sub-graphs. In the graph 250 of FIG. 5, the vertexes labeled "driving" and "license" are articulation points. In the graph 280 of FIG. 6, the vertex labeled "pole" is an articulation point.

Figure 7A:
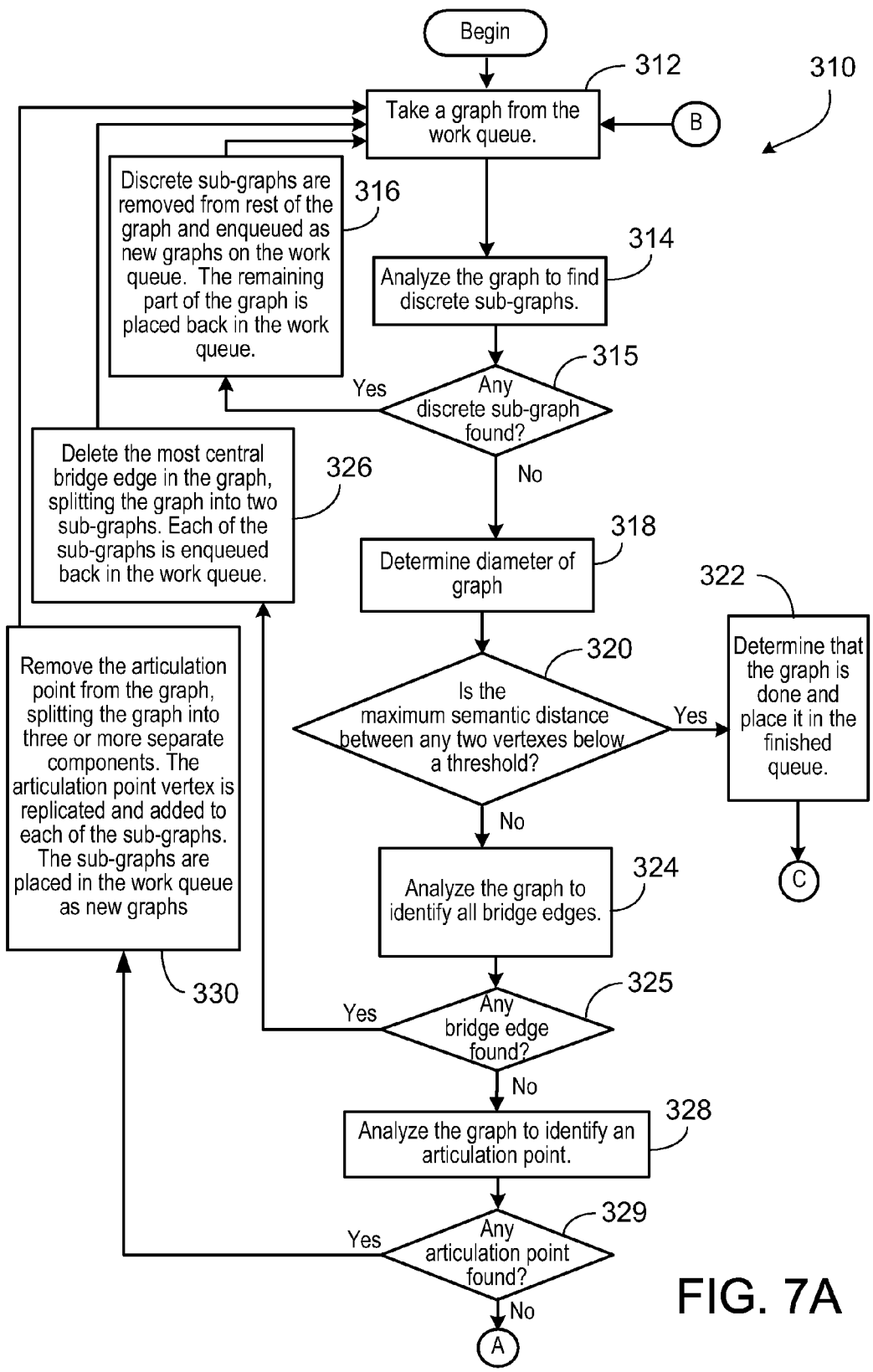
FIGS. 7A and 7B show a flow diagram of an example graph reduction process.
Figure 7B:
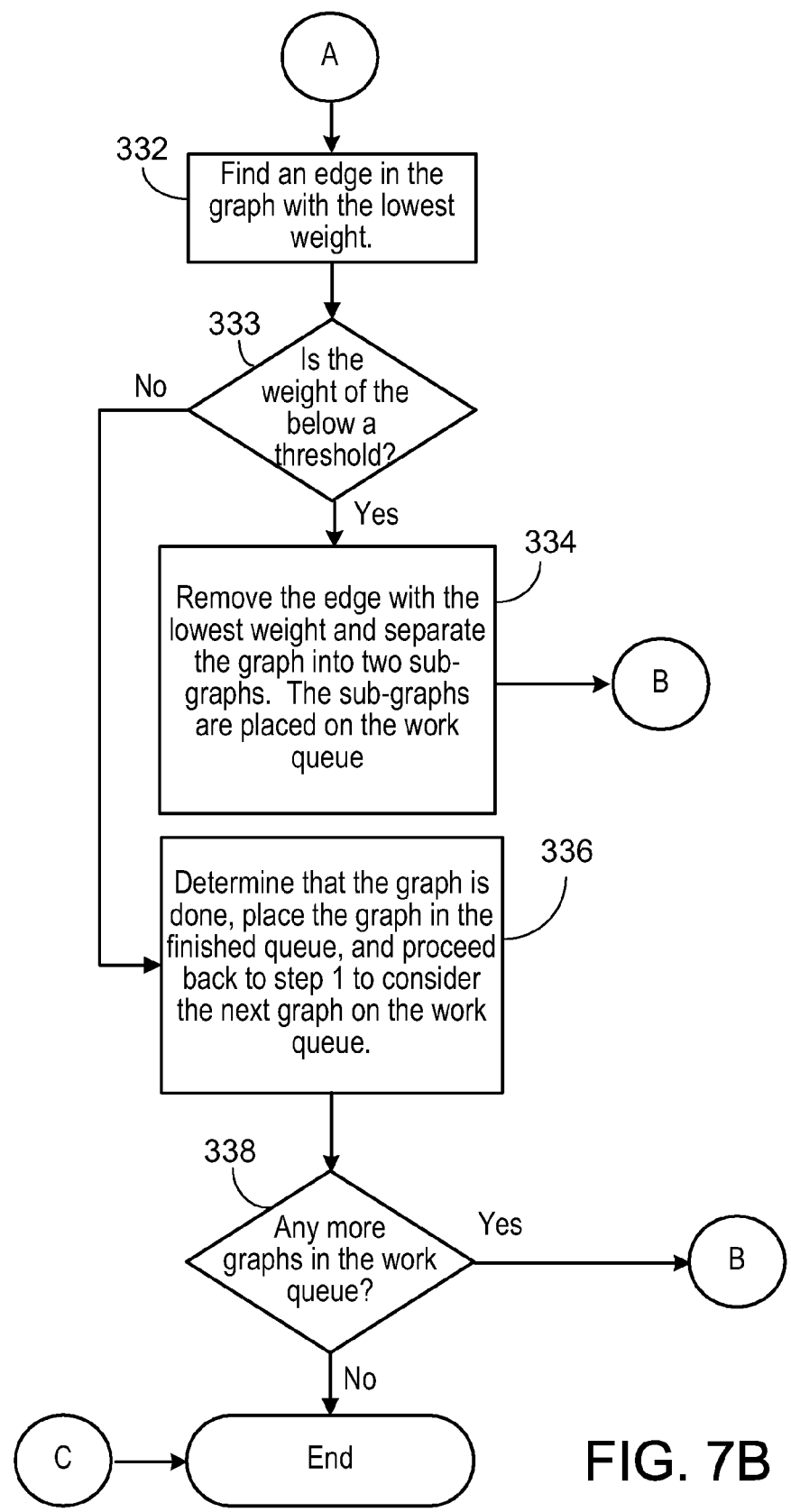

Referring to FIGS. 7A and 7B, an example graph reduction process 310 can reduce the graph 250 or 280 into sub-graphs each representing a sub-group of key terms. For example, the process 310 can be executed by the graph reduction engine 170. The graph reduction process 310 includes the following steps:

Step 1: Take a graph from the work queue (312).

Step 2: The process 310 analyzes the graph to find discrete sub-graphs (314). A discrete sub-graph is a set of one or more connected vertexes that are not joined to the rest of the graph by any edge paths. Discrete sub-graphs often form around semantic clusters. If any sub-graphs are found (315), they are removed from the rest of the graph and enqueued as new graphs on the work queue (316). The remaining part of the graph is placed back in the work queue, and the process 310 returns to step 1 (block 312).

Step 3: If there are no discrete sub-graphs in the graph under consideration, the process 310 computes the diameter of the graph (318). One metric for determining the diameter of a graph is the maximum distance between two vertexes. If the maximum semantic distance between any two vertexes is below a threshold (320), the process 310 determines that the graph is done and places the graph in the finished queue (322). Finished graphs will not be reduced further.

Steps 4-7 are executed only if a graph under consideration does not have discrete sub-graphs and has a maximum semantic distance above or equal to the threshold.

Step 4: The process 310 examines the graph to identify all bridge edges (324). If one or more bridge edges are found (325), a central (e.g., the most central) bridge edge in the graph is deleted (326), causing the graph to split into two sub-graphs. Each of the sub-graphs is enqueued back in the work queue, and the process 310 loops back to step 1.

Step 5: If there are no bridge edges in the graph, the process 310 looks for articulation points (328). If an articulation point is found (329), the articulation point is removed from the graph (330), causing the graph to split into three or more separate components—at least two sub-graphs and the single unconnected articulation point (which forms a degenerate graph of one vertex). The articulation point vertex is replicated and added to each of the sub-graphs. The sub-graphs are placed in the work queue as new graphs, and the process 310 loops back to step 1.

Step 6: If there are no bridge edges and no articulation points in the graph, the process 310 finds the weakest edge, i.e., the edge in the graph with the lowest weight (332). If the weight is less than a preset threshold (333), the edge is removed (334). The threshold for defining an edge as "weak" can be based on the diameter of the graph. The threshold is set to allow edges of large diameter graphs to be removed liberally and to limit the removal of the edges of smaller diameter graphs (so that the graphs do not become too small). Once an edge has been removed, the graph is placed on the work queue (e.g., execution can begin again at step 1).

The process 310 keeps track of the strongest and weakest edges (edges having minimum weights) in the graph as the edges are added or removed, and thus is able to determine which edge is weakest. In some cases, there may be several weakest edges having the same weight. In some implementations, if a graph has a diameter larger than a first threshold, and the minimum weight is below a second threshold, all of the edges having the minimum weight is removed at the same time. This can allow the graph reduction algorithm to scale better with very large graphs.

Step 7: If no edge is sufficiently weak to be removed, the process 310 determines that the graph is done and places the graph into the finished queue (336). The process 310 determines whether there is any more graph in the work queue. If there is one or more graphs in the work queue, the process 310 returns to step 1 to consider the next graph in the work queue (338).

The process 310 ends when the work queue is empty. At this point, the contents of the finished queue are either connected graphs with two or more vertexes (and one or more edges) or degenerate graphs with only one vertex (and no edges). The connected graphs with two or more vertexes represent "semantic clusters" of key terms and can be treated as groups suitable for forming new ad groups. The key terms associated with the degenerate graphs are placed together in a leftover terms list, which will be used to form a "leftovers" ad group.

The process 310 uses the diameter of a graph as a metric for determining how closely related the graph's vertexes are, and for determining whether a graph is done. The diameter of a graph can be computed by running Dijkstra's algorithm from each vertex in turn, keeping track of the minimum distance between the starting vertex and all other vertexes in the graph. The amount of computation required for running this algorithm once is proportional to O(num_vertexes+num_edges), where num_vertexes represent the number of vertexes, and num_edges represents the number of edges. The algorithm is run from each vertex in turn, so the amount of computation becomes proportional to O(num_vertexes$^2$+num_edges*num_vertexes). In dense graphs, the number of edges is proportional to num_vertexes$^2$, so the amount of computation used to run the traversal from every vertex in a dense graph is proportional to O(num_vertexes$^3$).

For very large graphs (e.g., having more than 40 vertexes), the process 310 may use other metrics for determining whether a graph is done to reduce computation time. For example, edge density ratio (i.e., the number of edges in the graph divided by the number of possible edges in the graph) can be used to determine whether a graph is done. As the edge density ratio approaches 1.0, it means that the graph is more interconnected and therefore more likely that the diameter will not be very large. Such a graph is more likely to represent a semantic cluster. As another example, the minimum edge weight of a graph can also be used to determine whether the graph is done.

In step 2 described above, the reduction process 310 identifies discrete (or disjoint) sub-graphs and removes the set of edges and vertexes in a disjoint sub-graph from the rest of the graph. This can be achieved by performing a depth-first traversal of the graph. The traversal can begin from any vertex. During the traversal, each vertex that is reached is marked as visited. When the recursive traversal has finished, if some vertexes in the graph are not visited, there exists at least two disjoint sub-graphs in the overall graph. In this case, all visited nodes are saved as a sub-graph, and the traversal process is restarted from an unvisited vertex. The process of saving disjoint sub-graphs and restarting the depth-first traversal is continued until all vertexes in the graph are visited (and marked as part of a sub-graph).

The complexity of a depth-first traversal of the graph is O(num_vertexes+num_edges). The number of edges is bounded by:

$$\text{num\_edges} = \frac{\text{num\_vertexes} \cdot (\text{num\_vertexes} - 1)}{2}$$

Thus, the amount of computation for the depth-first traversal is proportional to O(num_vertexes$^2$) for dense graphs. As the number of vertexes increases, identifying disjoint sub-graphs, bridge edges, and articulation points can become computationally intensive.

In some implementations, part of the reduction process 310 involves eliminating bridge edges in a specific order—central bridge edges are removed before removing outlying bridges. This requires identification of bridge edges and estimation of their distances from the center of the graph. Identification of bridge edges can be accomplished during a depth-first traversal of the graph (e.g., at the same time that disjoint sub-graphs are identified). This can be achieved by assigning each graph vertex a number from 1 to N during the traversal. The root of the traversal is assigned number 1, and every vertex visited thereafter is assigned a subsequent number. For each vertex visited on the traversal, the lowest number vertex reachable from that vertex without using the edge that the recursion used to reach that vertex (i.e., the "back edge") is computed. If, while considering adjacent nodes, the process 310 can traverse to one and find that the lowest number vertex it can reach is itself, then the edge between this vertex and that one is a bridge.

A single graph may have more than one bridge. For example, the graph 250 of FIG. 5 includes two bridges: a bridge 276 between "driving" 258 and "license" 260 and another bridge 278 between "car" 264 and "audi" 266. In some implementations, bridges that are more important are removed before the less important ones. The importance of a bridge can be determined by calculating the sum of the degrees of the vertexes on either side of it. In this example, bridge 276 is more important than bridge 278. Because the bridge detection takes place as part of the depth-first graph traversal, the amount of computation is proportional to O(num_vertexes+num_edges)=~O(num_vertexes$^2$).

The detection of an articulation point in a graph, similar to the detection of a bridge edge, can be accomplished during a depth-first traversal of the graph. For example, each graph vertex can be assigned a number from 1 to N during the depth-first traversal. The root of the traversal is assigned number 1, and every vertex visited thereafter is assigned a subsequent number. For each vertex visited on the traversal, the lowest number vertex reachable from that vertex without using the edge that the recursion used to reach that vertex (i.e., the back edge) is computed. If, while considering adjacent nodes, the system traverses to one and finds that the lowest number vertex it can reach is the parent node, then it can be concluded that it reached the parent node by some means other than the back link. Therefore, the parent node is an articulation point. Because the bridge detection takes place as part of depth-first graph traversal, the amount of computation is proportional to O(num_vertexes+num_edges)=~O(num_vertexes$^2$).

In some examples, when a larger group of terms is split into two or more smaller sub-groups using the graph reduction process, the average semantic distance between terms in a sub-group is smaller than the average semantic distance between the terms in the original larger group.

5.2 Dot Product Based Agglomerative Clustering

The dot product based agglomerative clustering algorithm can, in some circumstances, be faster than the graph reduction algorithm and can be used as an alternative to the graph reduction algorithm. In one implementation, the dot product based agglomerative clustering algorithm begins with each key term leftover from the phase one N-gramming process in its own individual group. For each of the groups, a call to the semantic database server 126 is made to obtain the set of topic clusters associated with the group, the strength of each topic cluster's association with the group, and a smooth distribution list of the top N (e.g., N=50) terms that are most strongly related to the group.

The algorithm iterates over all sets of two groups and computes how similar the groups are to each other using a function that closely resembles a dot product. The set of topic clusters and their activation weights are treated as a vector. For example, if a group is associated with topic clusters A, B, and C with weights 0.25, 0.45, and 0.66 respectively, the group can be represented by a vector:

g=<A:0.25, B:0.45, C:0.66>

A first portion of the similarity score of the two groups is the traditional dot product of the vectors:

$$v \cdot w = \sum_{i=1}^{n} v_i w_i = v_1 w_1 + v_2 w_2 + \ldots + v_n w_n,$$

where v is a vector that represents a first group, w is a vector that represents a second group, $v_i$ represents the weight of cluster ID i associated with the group v, and $w_i$ represents the weight of cluster ID i associated with group w. If two groups are associated with the same cluster ID i, $v_i w_i$ will have a non-zero contribution to the dot product. A higher v·w means that groups v and w are both associated with similar cluster IDs, so the two groups are more similar to each other. A secondary portion of the similarity score is computed by identifying overlapping terms in the smooth distribution lists of the groups.

In some implementations, a cosine similarity between two vectors is used as the similarity score. For example, before computing the dot product from two vectors, the algorithm performs L2 normalization on each vector, that is, each vector is modified such that the sum of the squares of the weights of the elements in the vector is equal to 1. The dot product of a normalized vector and itself is equal to 1.0, and the dot product of a normalized vector and another vector (that is not identical to the normalized vector) will be less than 1.0. The similarity score a·b is equal to $|a||b|\cos(\theta)$ when interpreted geometrically, where $\theta$ is the angle between two vectors a and b in n dimensional space. When the vectors a and b are normalized, $|a||b|=1$, so $a·b=\cos(\theta)$, which is the cosine similarity value.

Groups that are strongly similar to each other are merged to form larger groups. During some of the merger processes, the semantic database server 126 can be accessed to provide a more precise semantic concept of the group by refining the set of topic clusters and the smooth distribution list of the merged group.

In some examples, when a larger group of terms is split into two or more smaller sub-groups using the agglomerative clustering method, the average semantic distance between terms in a sub-group is smaller than the average semantic distance between the terms in the original larger group.

6. Associating Creatives and Negative Key Terms to New $A_d$ Groups

When phases one and two have been completed, the ACSS server 120 has partitioned the initial group of key terms into N distinct sub-groups (where N≥1). Each of the sub-groups includes one or more key terms.

In phase three, ad group creatives and negative key terms are associated with the new positive key term sub-groups. If a leftovers sub-group of positive key terms was created, it is given a full copy of all creatives and negative key terms from the original ad group. Other than the leftovers sub-group, creatives and negative key terms are associated with new positive key term sub-groups in a way that maximizes the relevance between the creatives and the sub-groups.

To determine which creative is more relevant to which sub-group of positive key terms, the semantic database server 126 is accessed to find the topic clusters for the creatives and the sub-groups. Specifically, for each creative, a list of the terms in the text of the creative is sent to the semantic database server 126 to obtain the topic clusters that are associated with the list of terms. Similarly, for each sub-group of positive key terms, a list of the positive key terms is sent to the semantic database server 126 to obtain the topic clusters that are associated with the list of positive key terms. The topic clusters for each creative is compared with the topic clusters for each sub-group of positive key terms. When there is an overlapping of topic clusters between a creative and a sub-group, this indicates that the creative and the sub-group are mutually relevant.

Similarly, each negative key term is sent to the semantic database server 126 to obtain the topic clusters that are associated with the negative key term. The topic clusters for each negative key term is compared with the topic clusters for each sub-group of positive key terms. When there is an overlapping of topic clusters between a negative key term and a sub-group of positive key terms, this indicates that the negative key term and the sub-group of positive key terms are mutually relevant.

7. Process for Automatically Optimizing Advertising Campaigns

Figure 8:
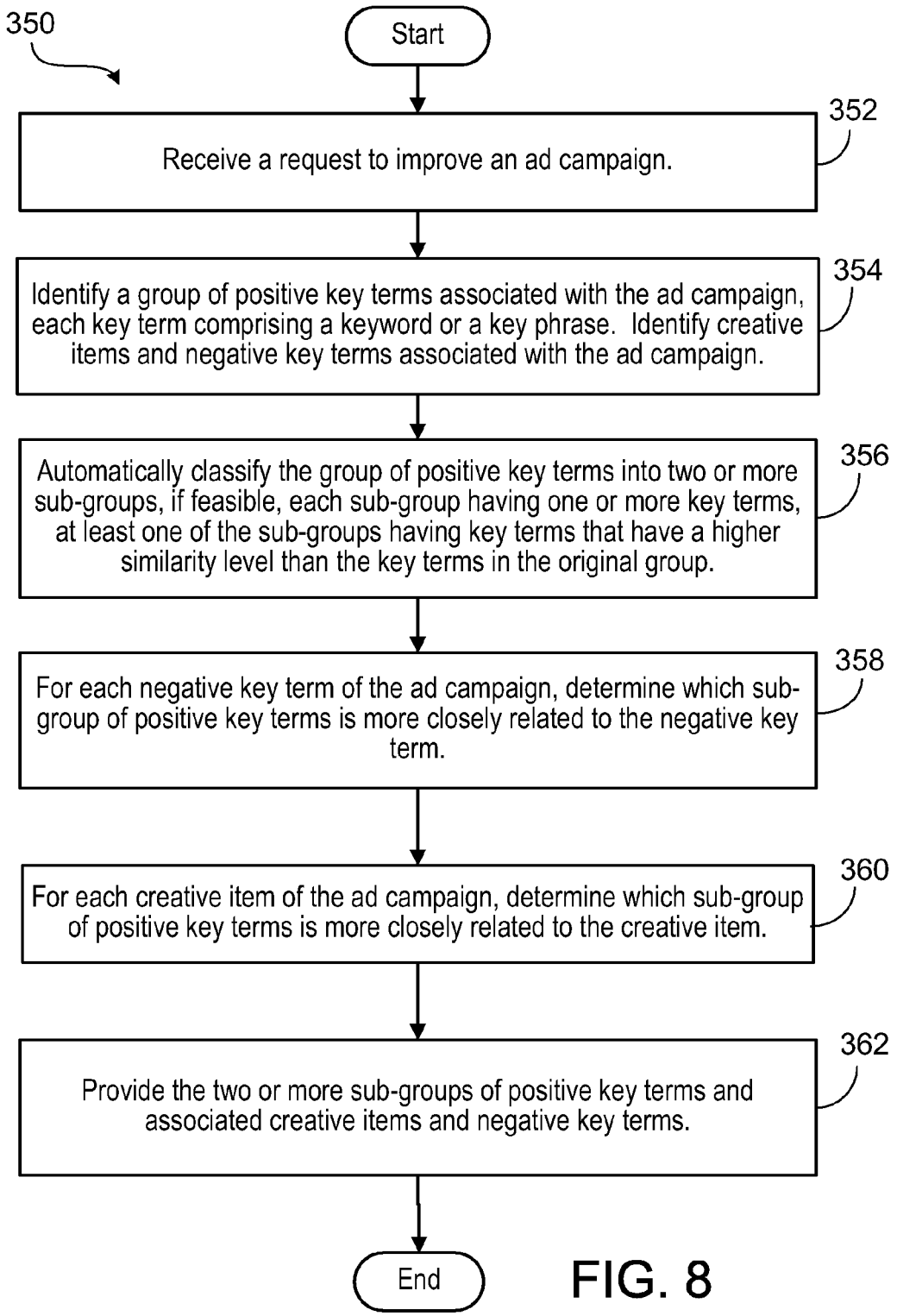
FIG. 8 is a flow diagram of an example process for automatically optimizing advertising campaigns.

FIG. 8 is a flow diagram of an example process 350 for automatically optimizing advertising campaigns. Initially, a request to improve an ad campaign is received (352). For example, the request can be sent by the advertiser 104 and received by the ACSS server 120 (FIG. 1). The process 350 identifies a group of positive key terms associated with the ad campaign, each key term comprising a keyword or a key phrase (354). The process 350 also identifies creative items and negative key terms associated with the ad campaign.

The process 350 analyzes the group of positive key terms. If the process 350 determines that key terms can be grouped into smaller sub-groups that are more focused or closely related, the process 350 automatically classifies the positive key terms into two or more sub-groups each having one or more key terms (356). At least one of the sub-groups has key terms that have a higher similarity level than the key terms in the original group. For example, the ACSS server 120 can automatically classify the positive key terms into two or more sub-groups. N-gram clustering, graphic reduction, and dot product agglomerative clustering can be used to classify the positive key terms.

For each negative key term of the ad campaign, the process 350 determines which sub-group of positive key terms is more closely related to the negative key term (358). For each creative item of the ad campaign, the process 350 determines which sub-group of positive key terms is more closely related to the creative item (360). For example, the matching between a creative and a sub-group of positive key terms can be determined based on finding overlapping topic clusters associated with the creative and the sub-group. Similarly, the matching between a negative key term and a sub-group of positive key terms can be determined based on finding overlapping topic clusters associated with the negative key term and the sub-group of positive key terms. The topic clusters associated with each of the sub-group of positive key terms, the creatives, and the negative key terms can be obtained from the semantic database 128.

The process 350 outputs an optimized ad campaign, including the two or more sub-groups of positive key terms and associated creative items and negative key terms (362). For example, the ACSS server 120 can provide the sub-groups of positive key terms and associated creative items and negative key terms to the advertiser 104.

Figure 9:
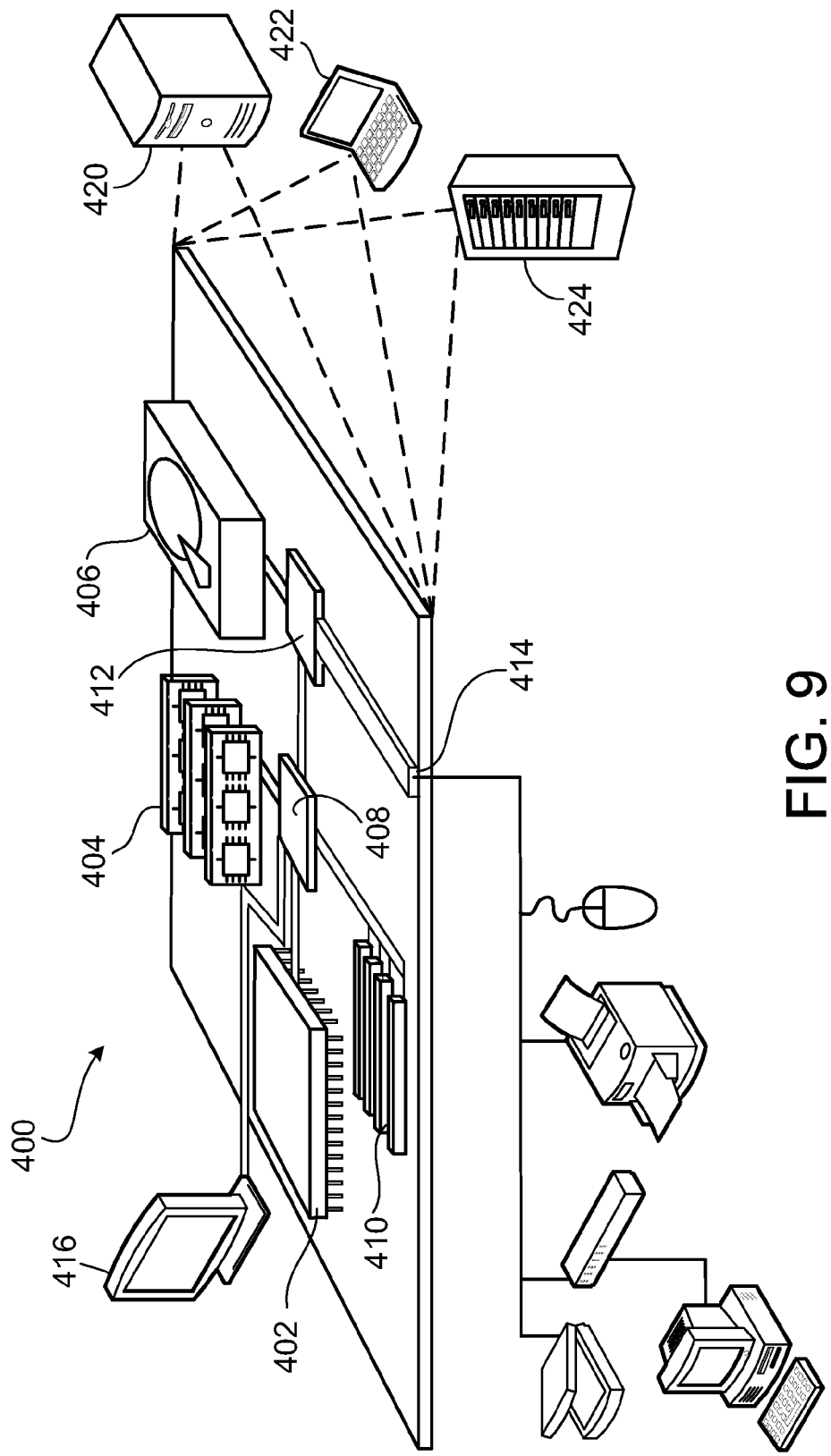
FIG. 9 is a schematic representation of a general computing system.

FIG. 9 shows a schematic representation of a general computing system or device 400 that can be used to implement the system 100. Computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Each of such devices (e.g., standard server, rack server system, personal computer, laptop computer) may contain one or more of computing device 400, and an entire system may be made up of multiple computing devices 400 communicating with each other.

Various implementations of the systems and techniques described here can be realized in digital electronic circuitry, integrated circuitry, specially designed ASICs (application specific integrated circuits), FPGAs (field programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used herein, the terms "machine-readable medium" "computer-readable medium" refer to any computer program product, apparatus and/or device (e.g., magnetic disks, optical disks, magneto optical disks, Programmable Logic Devices (PLDs), any type of memory, such as semiconductor memory devices (e.g., EPROM, EEPROM, and flash memory devices)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described in this specification), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Various forms of the flows shown above may be used, with steps re-ordered, added, or removed. Also, although several applications and methods have been described, it should be recognized that numerous other applications are contemplated.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. Instead of using dot products or graph theory to cluster the key terms, other data clustering algorithms can be used. For example, non-hierarchical clustering such as a k-means algorithm or other such algorithm can be used to cluster objects based on attributes into k partitions. Other alternatives for partitioning data, such as quality threshold clustering, may be used. The graphical user interfaces 200 and 220 can be configured differently from those described above. The semantic distances among words can be determined using various methods. For example, the semantic distance between two terms can be determined based on several signals, including the raw count of edges in a semantic graph between the two vertexes representing the terms and the ratio between the strength of each edge on the path between the vertexes and the maximum weight in the graph.

In some examples, the creative items of an ad may include links to landing pages, which are pages that users see after clicking on the ad. Topic keywords (and/or key phrases) can be extracted from the landing pages and added to the group of ad keywords provided by the advertisers, then the whole set of keywords are processed by the system 100 to generate sub-groups of keywords each having a higher level of semantic similarity. The sub-groups of keywords are used to form new ad campaigns. Topic keywords can be extracted from a landing page by, for example, sending the landing page to the semantic database server 126 to find the words in the semantic database 128 that are most relevant to the words in the landing page.

What is claimed is:

1. A computer-implemented method, comprising:
identifying an original group of key terms associated with an ad campaign, each key term comprising a key word or key phrase, wherein the ad campaign includes a plurality of creatives including a first creative and a second different creative;
determining a semantic relatedness of the plurality of key terms in the group of key terms;
automatically classifying the original group of key terms into two or more sub-groups each having one or more key terms, at least one of the subgroups having key terms that have a higher similarity level than the key terms in the original group;
for each sub-group, identifying a corresponding creative of the first or second different creative for which the sub-group optimizes a performance measure including determining performance of a given creative when served in response to a match of the key terms of the sub-group; and
providing a recommended match between a sub-group and a creative based on the identification including providing a recommendation for a first sub-group from the two or more subgroups to be associated with the first creative and a second sub-group from the two or more sub-groups to be associated with the second creative.

2. The method of claim 1 wherein automatically classifying the group of key terms comprises automatically classifying the key terms such that an average semantic distance between key terms in at least one of the sub-groups is smaller than an average semantic distance between the key terms in the original group.

3. The method of claim 2 wherein the semantic distance between key terms is determined based on semantic distances specified in a semantic database.

4. The method of claim 1 wherein automatically classifying the group of key terms comprises:
identifying N-grams that are common to a plurality of the key terms; and
classifying the group into two or more sub-groups based on the N-grams.

5. The method of claim 1 wherein automatically classifying the group of key terms comprises identifying semantic clusters of the key terms.

6. The method of claim 5 wherein identifying semantic clusters of the key terms comprises:
constructing a graph that represents relationships among the key terms; and
reducing the graph into two or more separate sub-graphs.

7. The method of claim 6 wherein constructing the graph comprises constructing a graph having vertexes and edges between the vertexes, each vertex representing a key term, each edge indicating a relationship between key terms represented by the vertexes connected by the edge.

8. The method of claim 7 wherein reducing the graph into two or more separate sub-graphs comprises finding and removing a bridge edge or an articulation vertex.

9. The method of claim 7 wherein constructing the graph comprises identifying a weight for each edge, the weight representing a strength of the relationship between key terms represented by the vertexes connected by the edge.

10. The method of claim 9 wherein reducing the graph into two or more separate sub-graphs comprises finding and breaking an edge having a weight that is less than a threshold value.

11. The method of claim 10 wherein the threshold value is determined based on the maximum weight of the graph.

12. The method of claim 11 wherein the threshold value is lower when the maximum weight is lower, and the threshold value is higher when the maximum weight is higher.

13. The method of claim 9, further comprising stop reducing the graph when a maximum weight of the edges is less than a threshold.

14. The method of claim 9 wherein identifying the weight for each edge comprises looking up a semantic database that has information about relationships among words or phrases or both.

15. The method of claim 5 wherein identifying semantic clusters of the key terms comprises determining whether to merge two key terms into a sub-group based on predetermined clusters in a semantic database that are associated with each key term.

16. The method of claim 15 wherein determining whether to merge two key terms into a sub-group is based on a smooth distribution list of terms associated with the key terms.

17. The method of claim 1 wherein the ad campaign is associated with one or more negative key terms, and automatically classifying the group into two or more sub-groups comprises classifying the group into two or more sub-groups of positive key terms without considering the negative key terms.

18. The method of claim 1, further comprising providing information about which one or more sub-groups of key terms are classified based on N-grams, and which one or more sub-groups of key terms are classified based on semantic clustering.

19. An apparatus, comprising:
a processor and memory;
an ad campaign suggestion engine configured to:
identify a group of key terms associated with an ad campaign, wherein the ad campaign includes a plurality of creatives including a first creative and a second different creative;
determine a semantic relatedness of the plurality of key terms in the group of key terms;
automatically classify the group of key terms into two or more sub-groups, each sub-group having one or more key terms, each key term comprising a keyword or a key phrase, at least one of the sub-groups having key terms that have a higher similarity level than the key terms in the group of key terms;
for each sub-group, identify a corresponding creative of the first and second different creative in the ad campaign for which the sub-group optimizes a performance measure including determining performance of a given creative when served in response to a match of the key terms of the sub-group and
provide a recommended match between a sub-group and a creative based on the identification including providing a recommendation for a first sub-group from the two or more subgroups to be associated with the first creative and a second sub-group from the two or more sub-groups to be associated with the second creative.

20. The apparatus of claim 19 wherein the ad campaign suggestion engine is further configured to communicate with a semantic database to obtain information about relationships among at least a portion of the key terms.

21. The apparatus of claim 20, further comprising a semantic database coupled to the ad campaign suggestion engine.

22. The apparatus of claim 19 wherein the ad campaign suggestion engine comprises an N-gram classification engine that identifies N-grams that are common to a plurality of the key terms in the group of key terms and classifies the key terms based on the N-grams.

23. The apparatus of claim 19 wherein the ad campaign suggestion engine comprises a semantic clustering engine that identifies semantic clusters of the key terms.

24. The apparatus of claim 23 wherein the semantic clustering engine comprises a graph reduction engine that constructs a graph having vertexes and edges between the vertexes, and reduces the graph based on the edges and vertexes, wherein each vertex represents a key term, and each edge indicates a relationship between key terms connected by the edge.

25. The apparatus of claim 23 wherein the semantic clustering engine comprises an agglomerative clustering engine that determines whether to merge two key terms into a sub-group by identifying predetermined clusters in a semantic database that are associated with each key term, and determining similarities between the two key terms based on the predetermined clusters associated with the key terms.

26. A system, comprising:
means for receiving a request to improve an ad campaign;
means for identifying a group of key terms associated with the ad campaign, each key term comprising a keyword or a key phrase, wherein the ad campaign includes a plurality of creatives including a first creative and a second different creative;
means for determining a semantic relatedness of the plurality of key terms in the group of key terms;
means for automatically classifying the group of key terms into two or more sub-groups, each sub-group having one or more key terms, at least one of the sub-groups having key terms that have a higher similarity level than the key terms of the group of key terms;
means for identifying a corresponding creative of the first and second different creative for which at least one of the two or more sub-groups of key terms optimizes a performance measure including determining performance of a given creative when served in response to a match of the key terms of the sub-group and
means for providing a recommended match between a sub-group and a creative based on the identification including providing a recommendation for a first sub-group from the two or more subgroups to be associated with the first creative and a second sub-group from the two or more sub-groups to be associated with the second creative.

* * * * *